United States Patent [19]

Timmer et al.

[11] Patent Number: 4,583,635
[45] Date of Patent: Apr. 22, 1986

[54] ARRANGEMENT FOR ALIGNING AND SUPPLYING FLAT PRISMATIC ARTICLES

[75] Inventors: Bernhard H. Timmer; Willem A. van der Hoef, both of Baarn; Martinus T. Beukeboom, Huizen, all of Netherlands

[73] Assignee: Polygram B.V., Baarn, Netherlands

[21] Appl. No.: 647,197

[22] Filed: Sep. 4, 1984

[30] Foreign Application Priority Data

Sep. 15, 1983 [NL] Netherlands .................. 8303182

[51] Int. Cl.⁴ .................. B65G 29/02; B65G 37/00; B65G 47/14; B65G 47/38
[52] U.S. Cl. .................. 198/382; 198/397; 198/424; 198/433; 198/443; 198/482.1
[58] Field of Search .............. 198/382, 383, 384, 803, 198/397, 418, 420, 424, 433, 443, 451, 484, 482.1, 478.1, 803.14

[56] References Cited

U.S. PATENT DOCUMENTS

| | | | |
|---|---|---|---|
| 847,451 | 3/1907 | Wilmore | 198/443 |
| 1,273,604 | 7/1918 | Gallup et al. | 198/420 |
| 1,627,391 | 5/1927 | House | 198/433 |
| 1,953,818 | 4/1934 | Paridon | 198/443 |
| 1,978,656 | 10/1934 | Thompson | 198/484 |
| 3,538,990 | 11/1970 | Brouwer et al. | 198/397 |
| 3,589,531 | 6/1971 | Povlacs | 198/803 |
| 3,848,733 | 11/1974 | McAlister | 198/803 |

FOREIGN PATENT DOCUMENTS

| | | | |
|---|---|---|---|
| 2200694 | 7/1973 | Fed. Rep. of Germany | 198/397 |
| 2456060 | 1/1981 | France | 198/443 |
| 206893 | 2/1984 | German Democratic Rep. | 198/443 |
| 111314 | 8/1980 | Japan | 198/443 |

Primary Examiner—Joseph E. Valenza
Assistant Examiner—Daniel R. Alexander
Attorney, Agent, or Firm—David R. Treacy

[57] ABSTRACT

Articles are dropped under the interior of a drum at its lowermost part, carried by partition walls of the drum to the uppermost part, and permitted to fall onto a further transport device. The drum has separation walls equally spaced from each other along the length of the drum, to form a number of rows of compartments which each can receive a single article and align the article in a preferred orientation. Each partition wall is formed as an angle profile, and each compartment includes an ejector engaging the angle profile. When the respective angle profile is at the highest point of drum rotation, the ejectors of the compartments associated with that profile are all moved away from the angle profile so that articles present in those compartments are ejected and fall onto the further transport device.

6 Claims, 6 Drawing Figures

ARRANGEMENT FOR ALIGNING AND SUPPLYING FLAT PRISMATIC ARTICLES

BACKGROUND OF THE INVENTION

The invention relates to an arrangement for aligning and supplying flat prismatic articles, such as tape cassettes or parts thereof and more particularly to such an arrangement comprising a rotatable drum having its axis in a horizontal position in a frame, and having at least at one side an at least partly open end face. The articles to be aligned are supplied to the lowermost part of the drum. The inner side of the drum is provided with a number of substantially radially extending partition walls, which upon rotation takes along a number of articles from the lowermost part of the drum to the uppermost part of the drum where the articles fall onto a further transport device.

Arrangements of the kind mentioned above are well known and are used for bringing different kinds of articles into a given position.

SUMMARY OF THE INVENTION

The object of the invention is to render such an arrangement suitable for aligning flat prismatic articles at a high speed.

According to the invention the partition walls have an angle profile, viewed in the direction of the circumference of the drum, and are arranged at equal relative distances which are slightly larger than a dimension of the articles. The height of the angle profiles is slightly larger than the thickness of the articles, while the inner wall of the drum is further provided with a number of separation walls arranged at equal relative distances corresponding to the width of the articles, in planes at right angles to the axis, so that a number of rows of compartments for the articles is formed.

Each of the compartments comprises an ejector engaging the relevant angle profile. Another device moves the ejector away from the relevant angle profile when the relevant angle profile is situated substantially at the highest point of the drum, so that the articles present in the compartments are ejected from these compartments and fall onto the further transport device arranged beneath the compartments.

In this manner, an arrangement is obtained in which the articles can be supplied in an unarranged state, for example by means of a conveyor belt, to the lowermost part of the drum. Upon rotation of the drum, the articles will become located in the compartments in which they are taken along to the highest point of the drum. When they have arrived at this point, the articles are ejected from the compartments by the ejectors, after which these compartments are aligned to the further transport device.

According to a further embodiment of the invention, at each partition wall the relevant ejectors are constituted by a rod which extends throughout the length of the drum and which is provided at both sides of the drum with a lever which has a cam and which is loaded by a spring in such a manner that the rod is pulled against the relevant angle profile. At each side of the drum a roller arranged substantially at the highest point of the drum moves the cam of each rod so that the relevant rod is moved away from the relevant angle profile.

In this manner, the ejectors of adjacent compartments are united to a single element, which simplifies the construction.

In a further embodiment, at a certain distance from the lowest point of the drum there is arranged at each side of the drum a further roller which, when a partition passes this point, also actuates the cam of the relevant lever so that the rod is moved away from the relevant angle profile for a short time.

In this manner, articles not correctly located in a compartment can be slightly displaced, after which they can fall indeed into their compartment or can fall back in unarranged state, whereupon they are positioned once more.

In a further embodiment of the arrangement the further transport device is a conveyor belt which extends through one of the end faces of the drum substantially as far as the other end face. A number of separation plates corresponding to the number of separation walls in the drum are arranged above the conveyor belt. These separation plates overlap the conveyor belt in the direction of width and are connected to each other. The separation plates can all simultaneously be lifted by a lifting device over such a distance that the articles can pass beneath them.

In this manner, the articles that fall out of the compartments can be held for a short time until they are all correctly located on the belt, after which the plates are lifted and the articles are transported further. Any small irregularity during the process in which the articles fall out of the compartments onto the belt is then corrected again.

The invention will be described more fully with reference to the drawing.

DESCRIPTION OF THE PREFERRED EMBODIMENT

Figure 1:
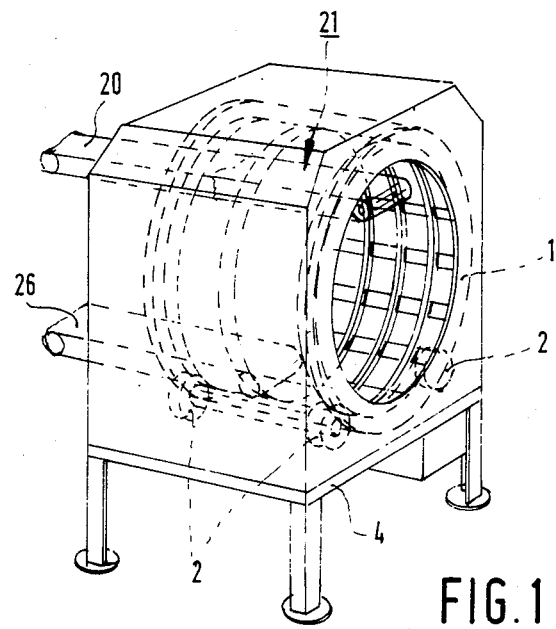
FIG. 1 is a perspective view of the arrangement according to the invention.

In the drawing, reference numeral 1 diagrammatically denotes a drum which bears on a number of rollers 2 and is guided in radial direction by these rollers, of which one is driven by an electric motor 3. The rollers 2 are arranged on shafts which are journalled at the lower side on a frame 4 of profile beams and at the upper side on a system of profile beams 5.

In the axial direction the drum is guided by a number of rollers 7 which cooperate with flanges 8, which are provided on both sides of the drum. The flanges 8 are proportioned so that they have a larger outer diameter than the drum wall, while the inner diameter is smaller than the diameter of the drum wall.

Figure 3:
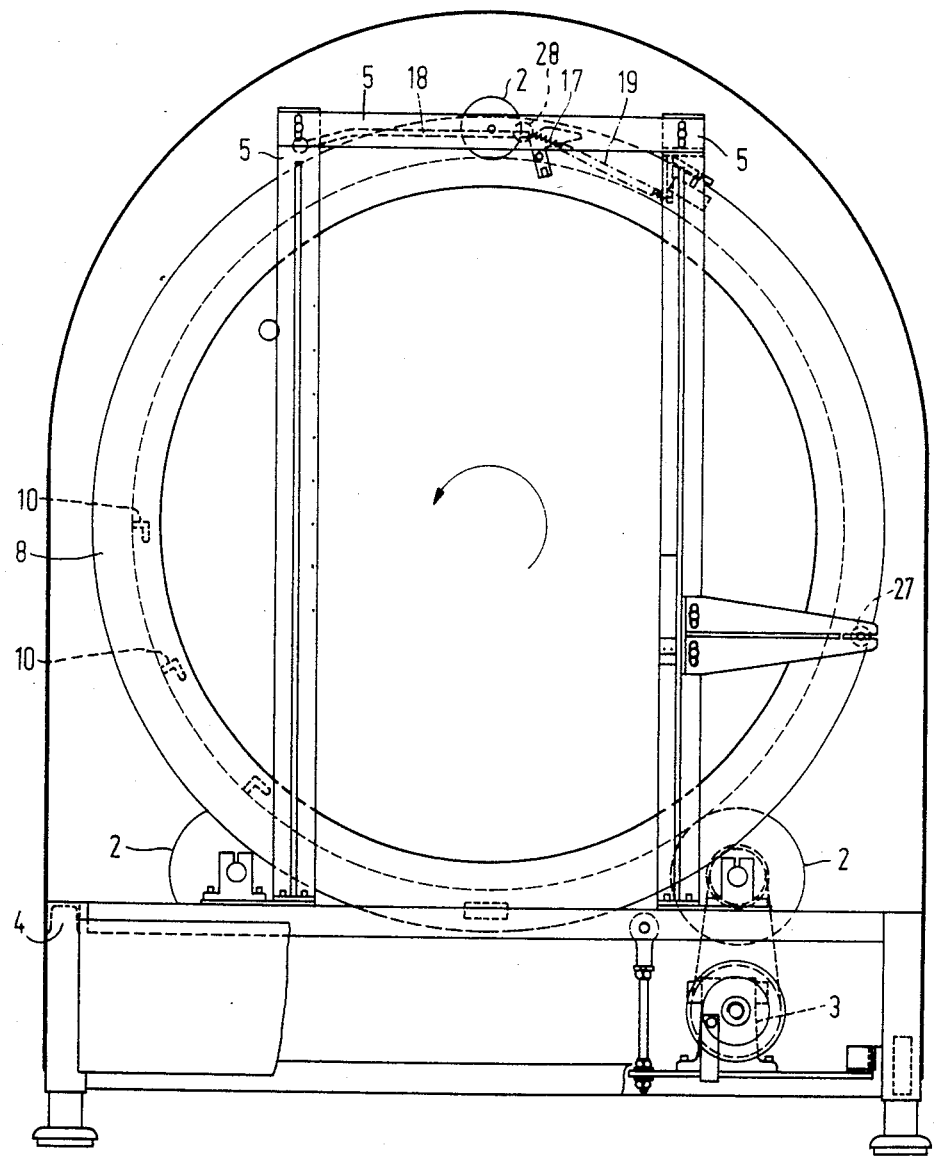
Figure 4:
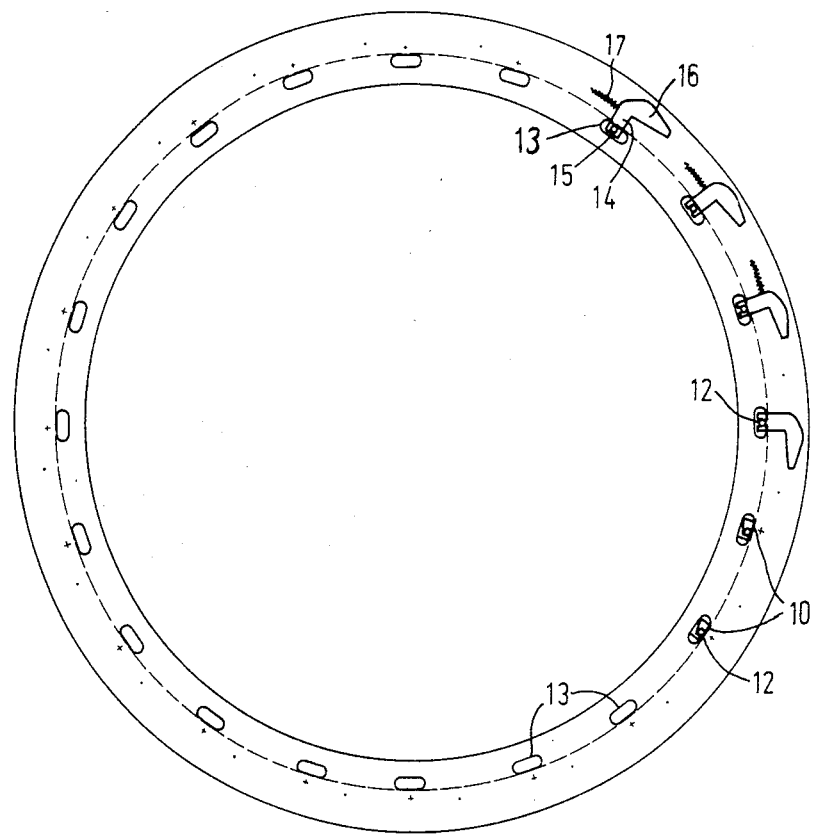
FIGS. 4 and 5 show the drum of the arrangement shown in FIG. 1 in two orthogonal elevations.

The inner wall of the drum is provided with a number of angle profiles 10 (FIGS. 3,4), which are arranged at a relative distance which is slightly larger than the dimension of the prismatic articles to be processed, such as tape cassettes.

Figure 5:
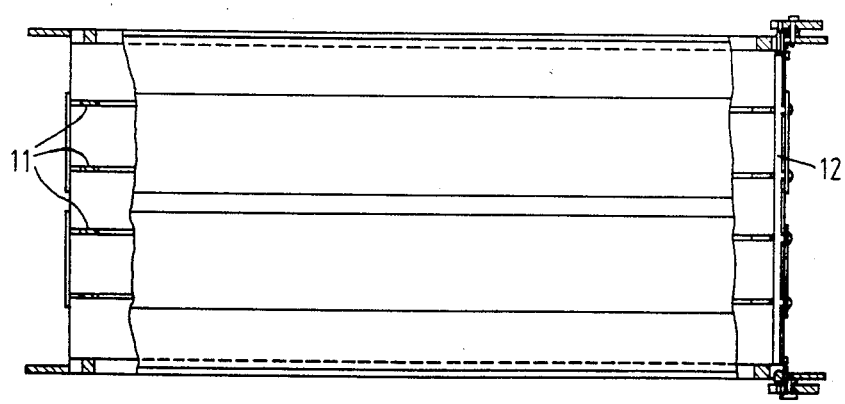

The drum wall is further provided with a number of separation walls 11(FIG. 5), which extend in planes at right angles to the axis. The relative distance of these walls substantially corresponds to the width of the cassettes to be aligned.

In this manner, a number of compartments are formed inside the drum, each compartment being adapted to receive a cassette.

Each angle profile 10 is associated with a rod 12 which bridges the whole length of the drum, these rods being received in recesses 13 in the flanges 8.

The flanges 8 are further provided with a number of tiltable levers 14, which are provided on the one hand with a recess 15 which is arranged to surround an end of the associated rod 12 and on the other hand with a cam 16. A spring 17 loads the levers 14 in such a manner that the associated rods 12 normally all engage their associated angle profile 10.

Upon rotation of the drum, the upper part of each of the cams 16 successively engages a roller 28 arranged on a profile 18, at the instant at which the levers 14 are at substantially the highest point of the drum. The cam 16 is stopped by the roller 28 so that, when the drum rotates, the lever 14 tilts and moves the rod 12 away from its associated angle profile. The cassettes present in the compartments are thus pressed out of the angle profile and fall downwards, whereupon they reach a conveyor belt 20. This conveyor belt 20 is passed through the end face of the drum.

Figure 1A:
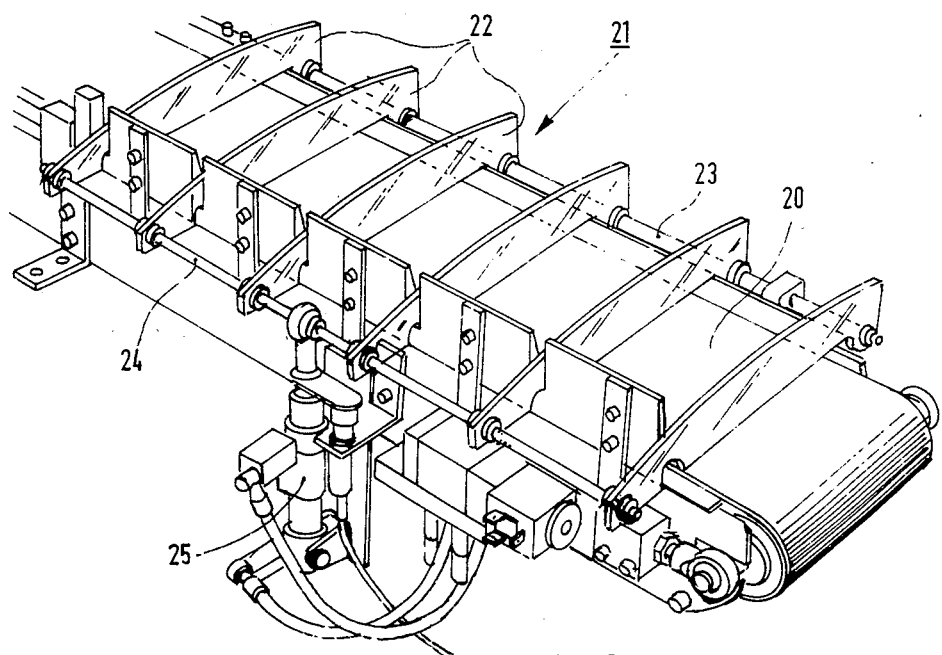
FIG. 1a is a perspective view of the transport device for taking away articles arranged by the drum.
Figure 2:
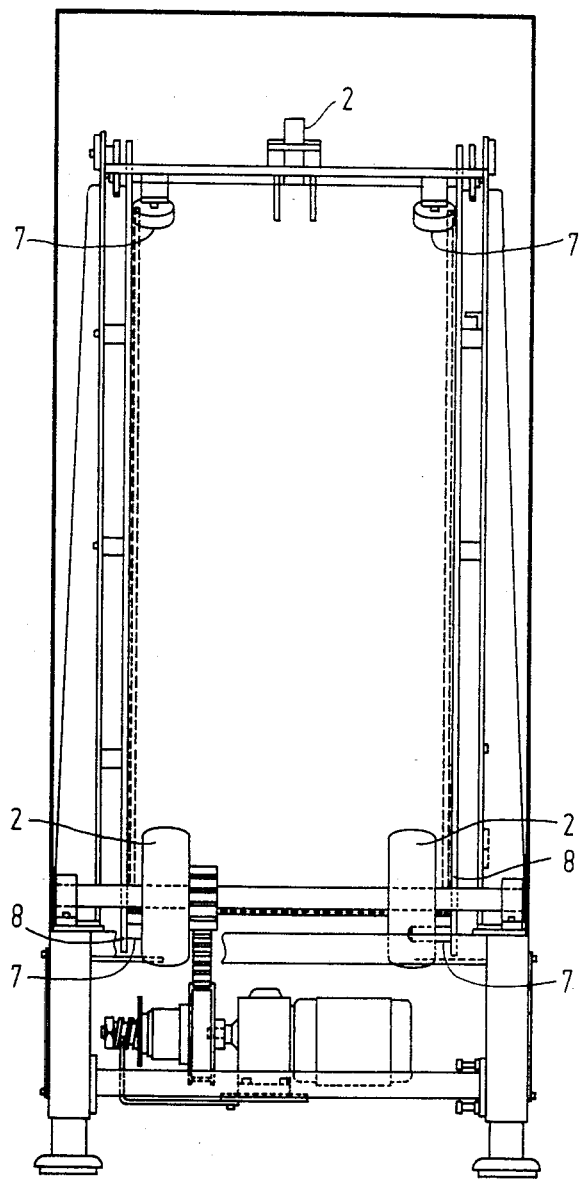
FIGS. 2 and 3 illustrate the arrangement shown in FIG. 1, partly in sectional view in two orthogonal elevations.

A "rake" 21 (FIG. 1a) is arranged above the conveyor belt 20 and beneath the drum. This rake mainly consists of a number of separation plates 22 which are provided at one side on a shaft 23 and at the other side are connected to a beam 24, which can be moved upwards by means of a pneumatic cylinder 25. This rake holds the cassettes falling onto the conveyor belt for a short time, until all the cassettes from one row of compartments have fallen onto the conveyor belt. When these cassettes are all positioned so as to be accurately aligned between the plates 22, the plates 22 are lifted by the cylinder 25 and the cassettes can be taken along further by the conveyor belt.

The cassettes are supplied in an unarranged state by means of a conveyor belt 26 which carries the cassettes to the lowermost part of the drum. Upon rotation of the drum, cassettes can become located in each compartment.

In order to adjust cassettes which are not quite correctly located in the compartments, after which they reach the correct position or fall back in unarranged state, a further cam roller 27 is provided, which again cooperates with the cams 16 of the levers 14. Upon passage of this roller, the cams and the levers are moved a little, as a result of which the rod 12 just "shakes" the relevant cassettes; immediately afterwards the roller has been passed and the rod again engages the angle profile, just like the cassettes. In this manner, incorrectly located cassettes are just aligned or fall back in unarranged state. It will appear from the foregoing that the invention provides an arrangement, by which cassettes can be aligned at high speed from an unarranged "bulk" state and supplied to a further processing machine. Besides cassettes, also other prismatic articles can be processed by the arrangement.

What is claimed is:

1. An arrangement for aligning and supplying flat prismatic articles, such as tape cassettes or parts thereof, comprising a frame, a rotatable drum having an axis arranged in a horizontal position, mounted in said frame for rotation about said axis, and having at least at one end an at least partly open end face to permit articles, to be aligned, to be supplied to the lowermost part of the drum; and a number of substantially radially extending partition walls formed as angle profiles, provided on an inner side of the drum, arranged such that upon rotation of the drum said partition walls take along articles from the lowermost part of the drum to the uppermost part of the drum where said articles fall from the drum, and a further transport device for receiving articles which fall from said uppermost part of the drum, characterized in that said angle profiles are arranged, viewed in the direction of the circumference of the drum, at equal relative distances which are slightly larger than a dimension of the articles, said angle profiles having a height slightly larger than the thickness of the articles, the inner wall of the drum comprises a number of separation walls arranged at equal relative distances corresponding to the width of the articles, in planes perpendicular to said axis, so as to form a number of rows of compartments for the articles, each of said compartments comprises an ejector arranged for engaging the respective angle profile and means for moving the ejectors of the respective compartments away from the respective angle profile when said respective angle profile is located substantially at the highest point of the drum, thereby ejecting articles present in the compartments such that said articles fall onto said further transport device.

2. An arrangement as claimed in claim 1, characterized in that each respective ejector is constituted by a rod extending the length of the drum, and a respective lever connected to the rod at each end of the drum, each said lever having a respective cam, and a spring arranged to load said lever such that the respective rod is pulled against the respective angle profile, and the arrangement further comprises a respective roller disposed at each drum end substantially at the highest point of the drum, arranged to engage a respective cam to move the respective rod away from the respective angle profile.

3. An arrangement as claimed in claim 2, characterized by comprising a respective further roller disposed at a location at each end of the drum spaced a given distance from the lowest point of the drum, and arranged such that, as an angle profile passes said location, said further roller actuates the respective cam of the respective lever so that the rod is moved away from the relative angle profile for a short time.

4. An arrangement as claimed in claim 3, characterized in that said further transport device is a conveyor belt extending through one of the drum end faces substantially as far as the other end face, and the arrangement further comprises a separation device arranged above the conveyor belt, having a number of separation plates corresponding to the number of separation walls in said drum, said plates being connected to each other and overlapping the conveyor belt in the direction of width of the belt; and lifting means for lifting all said separation plates simultaneously such a distance that articles which have fallen on the conveyor belt can pass beneath the separation plates.

5. An arrangement as claimed in claim 2, characterized in that said further transport device is a conveyor belt extending through one of the drum end faces substantially as far as the other end face, and the arrangement further comprises a separation device arranged above the conveyor belt, having a number of separation plates corresponding to the number of separation walls in said drum, said plates being connected to each other and overlapping the conveyor belt in the direction of width of the belt; and lifting means for lifting all said separation plates simultaneously such a distance that articles which have fallen on the conveyor belt can pass beneath the separation plates.

6. An arrangement as claimed in claim 1, characterized in that said further transport device is a conveyor belt extending through one of the drum end faces substantially as far as the other end face, and the arrangement further comprises a separation device arranged above the conveyor belt, having a number of separation plates corresponding to the number of separation walls in said drum, said plates being connected to each other and overlapping the conveyor belt in the direction of width of the belt; and lifting means for lifting all said separation plates simultaneously such a distance that articles which have fallen on the conveyor belt can pass beneath the separation plates.

* * * * *